United States Patent [19]

Mäder

[11] Patent Number: 5,784,278

[45] Date of Patent: Jul. 21, 1998

[54] PROCESSING SYSTEM WITH AN INTEGRATED IDENTIFICATION STRUCTURE

[75] Inventor: Carl C. Mäder, Hinwil, Switzerland

[73] Assignee: Ferag AG, Hinwil, Switzerland

[21] Appl. No.: 536,114

[22] Filed: Sep. 29, 1995

[30] Foreign Application Priority Data

Oct. 10, 1994 [CH] Switzerland ............ 03 042/94

[51] Int. Cl.⁶ .................................. G06F 19/00
[52] U.S. Cl. .................. 364/468.01; 364/468.22
[58] Field of Search ............ 364/468.01, 468.22, 364/468.23, 478.03, 478.09, 478.12, 478.13, 478.14, 478.15

[56] References Cited

U.S. PATENT DOCUMENTS

| | | | |
|---|---|---|---|
| 5,347,463 | 9/1994 | Nakamura et al. | 364/478 |
| 5,353,230 | 10/1994 | Maejima et al. | 364/468 |
| 5,434,792 | 7/1995 | Saka et al. | 364/468 |
| 5,555,504 | 9/1996 | Lepper et al. | 364/465.22 |

FOREIGN PATENT DOCUMENTS

| | | |
|---|---|---|
| 552 549 | 7/1993 | European Pat. Off. |
| 94 07 434.8 | 8/1994 | Germany. |

OTHER PUBLICATIONS

Geh A., *Identifikationssystem: Das Plus für jede SPS*, Electronik, vol. 43 No. 7, Apr. 5, 1994 (Munich, Germany) pp. 74–82.

Primary Examiner—James P. Trammell
Attorney, Agent, or Firm—Walter C. Farley

[57] ABSTRACT

An identification structure is associated with the processing system according to the invention. The identification structure is a structure covering the processing system and usable for ordering functions and which at different, time-varying points of the processing system can at any time take over the ordering function and which can be used at random points of the system additionally for control and/or checking purposes. The identification structure associated with the processing system makes it possible to extend virtually at random the system in the form of a uniformly ordered body. A further possibility provided by such an identification structure is the flexible utilization of the identification structure for additional security functions and/or for process evaluation functions (statistics, invoicing, accounts, etc.). The identification structure associated with the processing system essentially comprises multipart identifications, associated with elements of the system, as well as means associated with system elements enabling said elements to modify their own or other identifications.

11 Claims, 6 Drawing Sheets

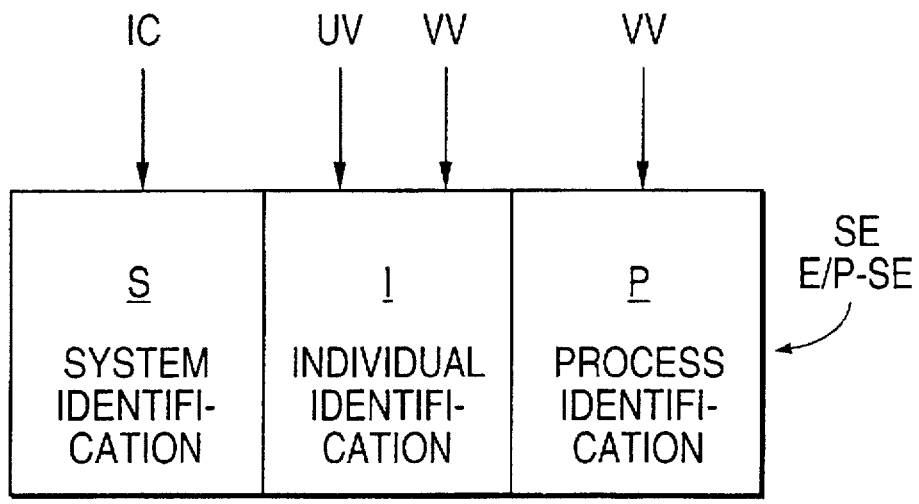
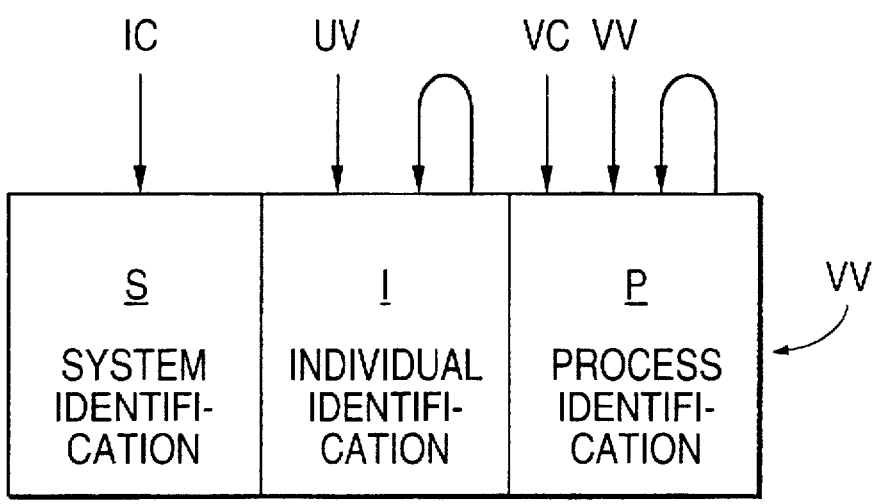

PROCESSING SYSTEM WITH AN INTEGRATED IDENTIFICATION STRUCTURE

FIELD OF THE INVENTION

This invention relates to a processing system and method with which from one or more educts (in the sense of moving from one processing system into another), via one or more intermediate products, one or more products are produced in a partly continuous and partly discontinuous manner. The processing is to be understood in the broadest sense as both a process for modifying the educts (production, working, etc.) and also a process for rearranging the educts (compiling, commissioning, sorting, etc.). In particular, for distinguishing the processing system from other such systems, for linking of continuous parts and discontinuous parts of the processing, as well as for control or checking purposes within the system and at its interfaces with other systems, in accordance with the invention an identification structure is associated with the processing system. The processing system together with the identification structure associated therewith forms an ordered structure with extended possibilities independent of local circumstances.

BACKGROUND OF THE INVENTION

For performing a process in which, from at least one educt (such as a product from another process) by means of at least one intermediate product, at least one end product is produced, it is necessary to have at least two active processing elements and, optionally, a plurality of active transporting elements.

If such a process is performed completely continuously, i.e., the educt is supplied as an educt stream from another process to the first processing element of the present process, and then as an intermediate product stream from the first to the second processing element and as a product stream from the second processing element is passed out of the process (an optionally into another process), then the present process can be relatively easily controlled by a process computer by controlling all of the active elements (processing and transporting elements). Monitoring of the resulting products and of the active elements of such a process is normally performed by means of sensors which measure the activity of the active elements and/or the quality of the educt/product and pass data resulting from the measurements to the process computer or to control systems dependent thereon.

Because the order of the products (educt→intermediate product→product) in such a purely continuous process is determined at any time by the processing control in a more or less rigid sequence, the educt/product elements are adequately "identified" by their process-controlled, time and place sequence. The active processing and transporting elements are also adequately "identified" by their functions and, in particular, by their functional locations in the process.

However, for non-continuous or only partly continuous process without a rigid product sequence, i.e., process in which a rigid order given by the continuity of processing is broken up, dissolved or partly non-existent, e.g., because of intermediate storage of intermediate products or by dynamic processing changes with functional and/or positional displacements of active processing elements, such a central control is much more complicated and leads to unpredictable implications. In order to avoid these unpredictable implications, normally one of two paths is taken: either the process-caused order and sequence is functionally and/or temporally restricted, or it is "frozen".

When restricting the process order, e.g., intermediate products to be intermediately stored are released from the process order and are later resupplied to the process as educts and following a processing change, a new process order is established at least partly independent of the earlier order. Thereby, intermediately stored intermediate products must be identified in some way as being "correct" for their reentry into the process, and this also applies to active processing elements when they enter a new process order.

For a "freezing" of the process order, which represents an extension of the process order beyond a continuous process part, e.g., intermediate products which are to be intermediately stored are stored in an order corresponding to the process order, identification of the intermediate products following their intermediate storage is rendered superfluous. Such a frozen process order can be a purely positional order, each intermediately stored element being clearly identified by, e.g., a predetermined location, or it can be a virtual order in which each intermediately stored educt/product unit is identified by a computer-controlled correlation between a freely selected location and an identity received in the process.

Such a temporal and positional extension of a process order for creating an order covering a complete process system is certainly advantageous in view of simple but at the same time complete automation. However, in most processing sectors having a slightly increased complexity, the extension of such a process order is neither possible nor appropriate for technical and organizational reasons. It would in particular be prejudicial to increased flexibility which is also required, because flexibility requires variable boundaries or limits for each process order and requires possibilities for appropriate measures dividing up, restricting and/or varying process orders.

SUMMARY OF THE INVENTION

In accordance with the invention, the desire for an order structuring a complete processing system for a process highly restricted regarding complexity and flexibility (e.g., completely continuous processes) by one process order is fulfilled by associating an identification structure with the processing system, or by integrating into the processing system an identification structure. Together with a process order, or with a plurality of process orders, the identification structure takes over ordering functions, particularly at points of the system where it is not possible to maintain a process order or where maintaining a process order would require unacceptable effort and expenditure.

If in a processing system for producing products from educts, the system having at least one process order in areas with continuous processing, an identification structure matched to the system and extending over, e.g., the entire system is introduced, the limits of the process order or orders within the system can be varied at any time because at points of missing "order" it is possible to revert to the ordering function of the identification structure. This applies in particular to transition points from process parts (e.g., continuous processing) with a process-caused order to process parts without such an order (e.g., intermediate stores, "unordered" processing) or to another, process-caused order. The identification structure is a structure covering the processing system. It serves for taking over ordering functions at any time at the most varied points of the processing system and it further can be used for control and/or checking purposes at freely selectable points of the system. The identification structure associated with the processing system makes it possible to freely extend the system as a uniformly ordered body, above and beyond the actual process. The identification structure, apart from an additional ordering system, represents a decentralization of the process data so that further possibilities are opened for the use thereof, e.g., selectable control functions, checking functions, security functions or evaluation functions (statistics, invoicing, accounts, etc.).

The processing system with associated identification structure according to the invention is so flexible that not only the actual processing is variable within wide limits without having to modify the identification structure, but also functions associated indirectly with the processing, such as the maintenance or servicing of system elements, can be incorporated into the processing system and therefore into the identification structure.

According to the invention, the identification structure of the processing system comprises identification data associated with system elements as well as authorization for modifying their own or foreign identification data or identification data parts, which authorizations are also associated with system elements. The structure of the identification data of each element and the association of the authorizations for modifying identification data are adapted to the functional structure of the system defined by the processing and optionally also defined by system parts only indirectly linked with the processing. The identification structure can be looked upon as a virtual image of the functional structure of the processing system.

A processing system according to the invention with the associated identification structure will be described hereinafter first in a general form and second using as an example the further processing of products of printing presses (e.g., rotary presses) for producing magazines, brochures, newspapers, books, etc. This further processing is an example of a process wherein maximum flexibility is required in addition to complete automation and which therefore is particularly well suited to the application of the inventive system with its associate identification structure. However, this does not in any way mean that the system according to the invention with the associated identification structure can only be used in this field.

A processing system for producing products from educts can be supplied from another, independent processing system and introduced into the present process and the resulting products can be supplied from the present process to yet another processing system. The present process has active and passive, system-inherent and non-system-inherent elements. Active elements are elements which in some way act on other active or passive elements and include processing devices, transporting or conveying devices and the like. Passive elements are elements acted on by active elements but are unable to act on other elements and can include educt/product elements, passive aids such as winding or roll cores, pallets, containers, and the like. System-inherent elements (processing devices, transporting devices, passive aids, etc.) substantially remain in the system and non-system-inherent elements (educt/product elements) only remain temporarily in the system. The sum of all the system elements and their capacities to act on other elements together form a functional structure in which the elements are organized in accordance with the nature of their acting authorizations which define on which other elements they are able and authorized to act, and in what way.

The identification structure associated, according to the invention, with the processing system or, more precisely, with its functional structure, comprises multipart identification data associated with system elements, as well as authorization for modifying own or foreign identification data parts which authorizations are also associated with system elements. The identifications are structured in such a way, and the authorizations for identification changes are so associated, that the identification structure corresponds to the functional structure of the processing system. Through the combination of the predetermined function structure with the identification structure, a new order system is obtained which represents a virtual order or organization.

Whereas the functional structure of a processing system orders all of the elements of a system, some of the elements may not belong to the identification structure, and actions allowed in the functional structure may be forbidden in the identification structure. However, no identification modifying authorization exists in the identification structure which has not a corresponding action in the functional structure of the processing system.

System elements are also able to read out identifications of other elements for checking and/or control purposes, and identification carriers can additionally be equipped with a passive capacity for refusing illicit changes to the identification or parts thereof.

If the system-inherent elements of the processing system with its associated identification structure are to be variable and the system inherent elements are to be interchangeable with other systems equipped with similar identification structures, then the system requires an identification controller associated with the entire system and controlling all of the elements contained in the identification structure and which can optionally communicate with other identification controllers of other systems.

The parts of the identification data which together form the identification of a system element are, for example, a part associated with the system (system identification); an individual part (individual identification); and a part associated with the present process (process identification), each of these parts being sub-dividable into further sub-parts.

BRIEF DESCRIPTION OF THE DRAWINGS

Processing systems with associated identification structures and components thereof in accordance with the invention will now be described in detail with reference to the attached drawings, wherein:

FIGS. 3–6 are functional block diagrams of multipart identifications of elements of the processing system and associated identification structure according to FIGS. 1 and 2.

DESCRIPTION OF THE PREFERRED EMBODIMENTS

Figure 1:
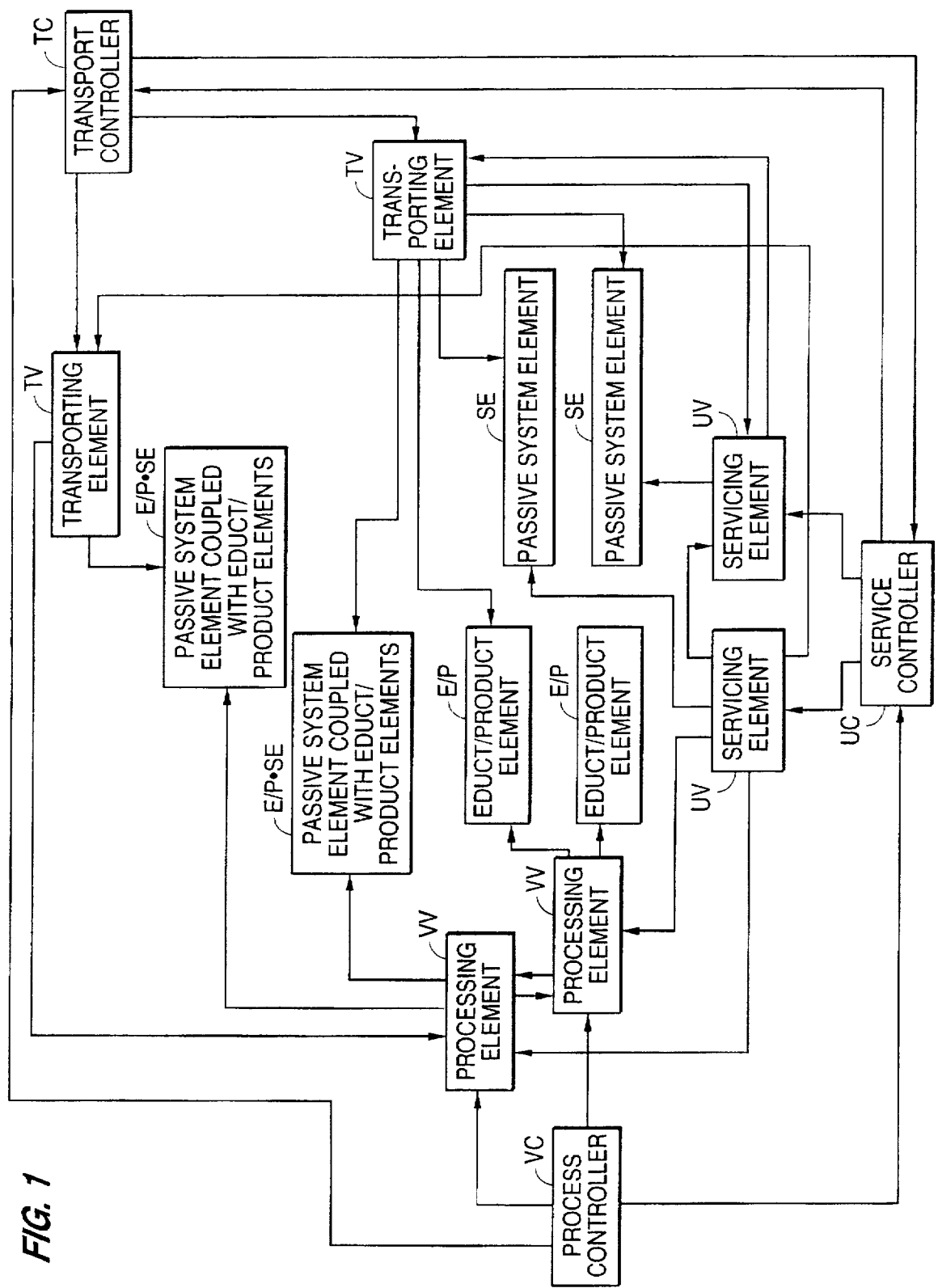
FIG. 1 is a functional block diagram of an example of a functional structure of a processing system with which products (educts) from a rotary press are further processed to consumer-profiled and distribution route-correct, packed printed product groups and system-inherent elements are maintained or serviced.

FIG. 1 shows, in a block diagram form, a functional structure in which are located the elements of a system for processing, in accordance with their capacities, different products of one or more rotary presses into different printed products. The processing takes place in part continuously and in part discontinuously. In particular, both educts (products from the rotary presses) and intermediate produces are in part continuously processed, in part intermediately stored and then together, possibly with subsequently obtained educts or intermediate products, undergo further processing. Into the system is also incorporated the maintenance or servicing of the system-inherent elements. The functional structure shown in FIG. 1 is an example from a plurality of possible structures for the system.

FIG. 1 shows system elements as blocks and possible actions by active elements modifying other active or passive elements as arrows directed from the active element to the acted-on element. The positional or local arrangement of the elements in FIG. 1 is purely random and has no functional significance. The functional structure of the elements of a processing system is a virtual and not a local structure, which virtual structure is defined by the elements present in the system and by their authorities to act on one another.

The processing system shown has passive elements in which action arrows point only toward such elements. Such elements are: pure educt/product elements E/P, i.e., non-system-inherent elements such as individual educts taken over into the system, products or intermediate products or, in each case, a plurality thereof. Such passive elements also include passive system-inherent elements SE (aids) such as winding cores or cassettes, pallets or containers, empty or loaded with pluralities of identical educts, intermediate products or products (E/P-SE) such as printed product rolls or pallets laden with printed products or containers holding printed products. Processing devices VV and mobile conveying or transporting devices TV act on these passive elements in a processing or relocating manner, and maintenance devices UV act on them in a system-maintaining manner.

Processing devices VV act on educts, intermediate products or products, i.e., on pure educt/product elements (E/P), e.g., on individual educts or intermediate products such as is conventional in the field of continuous processing (e.g., collecting drums, stitching devices), or they act on pluralities of educts, intermediate products or products combined with system-inherent elements such as winding stations acting on printed product rolls. Conveying means for the continuous supply or removal of educt/product elements to and from continuously operating processing devices are so rigidly bound in the processing that they can be classified as processing elements VV.

Apart from their processing activities acting on educts, intermediate products or products, processing devices VV can also have a controlling action on one another.

Mobile transporting devices TV (e.g., vehicles with or without manipulating tools, travelling cranes) act in a relocating manner particularly on elements E/P-SE (e.g., rolls, laden pallets, filled containers), on elements SE (e.g., winding cores, empty pallets, empty containers) or E/P (e.g., packages of printed products) but can also act on mobile processing devices VV (e.g., feeders) for making processing changes on mobile processing devices VV and on mobile maintenance devices UV for service and maintenance.

Maintenance devices UV, which in the broadest sense can be stationary and mobile equipment performing maintenance functions or maintenance fitters, act on processing devices WV, transporting devices TV and optionally on other maintenance devices UV. However, they also act on elements SE passively participating in the processing such as winding cores, pallets, containers, etc.

Processing devices VV, transporting devices TV and maintenance devices UV are controlled in each case by a controlling element, the controlling devices communicating with each other and thereby acting on each other. These controlling elements are typically a control element VC (processing controller) which is competent for the processing and directly controls processing devices VV (working devices and devices for continuous conveying or transporting between working devices) in accordance with a present process; a transport controller TC which controls mobile transporting devices TV and allocates to them destinations, loads and paths; and a maintenance controller UC which acts in a controlling manner on maintenance devices UV such as by determining their tasks and objects.

Processing, transporting and maintenance controllers VC, TC and UC also act mutually on each other. For example, the processing controller VC and maintenance controller UC can request transportation from the transport controller TC. The processing controller VC checks the states of processing devices VV and may request maintenance actions from the maintenance controller UC which has an altering effect on the controlling activity of the maintenance controller.

Figure 2:
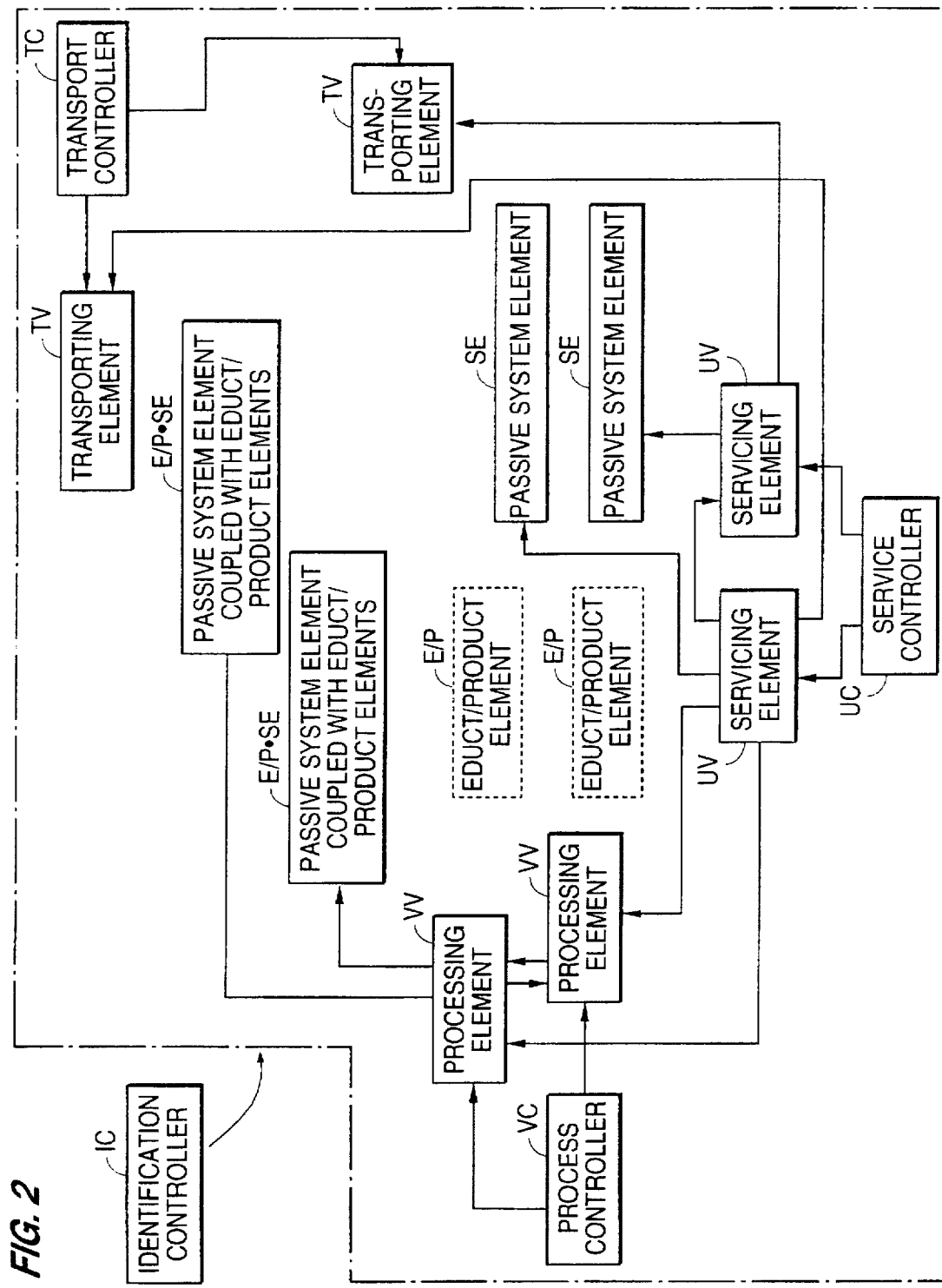
FIG. 2 is a functional block diagram of an identification structure associated with the functional structure of FIG. 1.

FIG. 2 shows an identification structure for the processing system represented by the functional structure of FIG. 1. As stated, the identification structure comprises element identification data and element authorizations for modifying element identification data, whereas the functional structure comprises elements used for processing in the broadest sense and their authorizations for acting on other elements in the sense of a physical modification. In the identification structure (FIG. 2) the system elements, i.e., the identification data are shown in the same places as in FIG. 1. Elements carrying no identification (not included in the identification structure) are shown in broken line form. The arrows indicate authorizations for modifying identification data and point as in FIG. 1 from the "active" element equipped with identification changing means to the passive element whose identification can be modified. A comparison of FIGS. 1 and 2 shows that the identification structure (FIG. 2) is a reduced image of the functional structure (FIG. 1), apart from the identification controller IC which is not an element of the functional structure and can act in varying manner on all element identifications, as is shown symbolically in FIG. 2 with an arrow pointing to a dot-dash line circumscribing all the elements.

FIG. 2 shows that the passive, non-system-inherent elements E/P carry no identification. This is appropriate if in the system pure educt/product elements occur only in continuous process areas with a process order, which is usual for the processing of small products such as printed products. In the continuous process areas, as stated hereinbefore, it is not vital to identify the educt/product because it is identified adequately by the process order. As soon as they leave a continuous process area, or optionally the process order, they are combined into groups with system-inherent, passive aids (SE), the educt/product-specific identification being carried by the aid. Thus, the passive, system-inherent element carries in a "loaded" case (E/P-SE) identification identifying its own load, and for an empty element (SE) the load-specific identification is a zero identification.

The above described identification strategy for educt/product elements is advantageous for the indicated case of a process in which the identification as part of a system-covering identification structure of individual educts/ products is too complicated or not very appropriate and it is certainly not obligatory. If the product to be produced (passive, non-system-inherent element) is larger and spends a longer period in the system, such as, for example, a car during its manufacture, it can be appropriate to provide each car as an educt/product element (E/P) with an identification, an identification carrier being applied to the car somewhere during the process and accompanying it in much the same way as a work-progress slip, advantageously up to its completion or even subsequently.

FIG. 2 shows that in the identification structure, as in the functional structure, the passive elements SE and E/P-SE cannot act in any identification-modifying manner (no arrows emanating from them), that the processing, transporting and maintenance devices (VV, TV, UV) have an authorization to modify the identification data of passive elements and can mutually act on each other in identification-modifying manner and that processing, transporting and maintenance controllers (VC, TC, UC) can modify the identifications of the devices dependent on them. Further details will be given in conjunction with FIGS. 3 to 6 of the restrictions on the identification-modifying actions compared with the functional actions.

The identification controller IC has no part in the functional structure (and is not shown in FIG. 1) because it is not possible for it to evolve any activity with respect to the processing in the broadest sense. The function associated with it in the identification structure is to act in a modifying manner on the system-relating part of the identification data of the system elements which is particularly necessary for creating a system, for introducing new elements into the system and for transferring elements from one system to another. Transfers from one system to another are usual in particular for mobile, passive elements such as, e.g., winding cores, which are delivered by one printing works to another printing works together with wound-on products.

As has been mentioned before, the example of a processing system as used as a basis for FIGS. 1 and 2, for further processing printing press products, is not the only system which can be formed into a processing system according to the invention by the association of an identification structure. Another extremely suitable system is one for commissioning a plurality of different articles, i.e., for producing predetermined consignments. Advantageously, the containers in which the consignments are produced are equipped with identification data carriers and, e.g., a central control and/or the supply source from which articles are supplied to the consignments being produced and are equipped with means for modifying the container identification data.

Moreover, as stated hereinbefore, it is possible to freely extend the processing system according to FIGS. 1 and 2. Thus, for example, the area of the printing presses and the area of the supply of the unprinted paper to the printing presses can at any time be incorporated into the processing system, i.e., the identification structure can be extended thereto, the printing presses representing an area with continuous but changing processing and the paper supply representing an area with discontinuous processing.

FIGS. 3 through 6 show multipart identifications such as can be associated with elements of a functional structure according to FIG. 1 and an identification structure according to FIG. 2. The totality of the identification parts which are shown as a row of "black boxes" in the figures is advantageously stored as a digital data set in an electronic memory which, particularly in the case of mobile elements, is advantageously fixed to the actual element.

FIG. 3 shows the identification of a passive element SE or E/P-SE. It comprises three partial identifications: a system identification S, an individual identification I and a process identification P. Identification-modifying actions are represented as arrows directed at the identification parts S, I and P which are designated with the element authorized to carry out the modification.

The system identification S identifies the element as being of a specific type (e.g., as a winding core) and as belonging to a specific system. It can only be modified by the identification controller IC which modification is necessary when the element is received in the system or leaves the system and is to be received in another system with a similar identification structure (e.g., as a winding core for a roll of intermediate products to be processed in a different processing system). The system identification is also used for preventing the modification of the identification of an element by an element not belonging to the same system or having no authorization for modifying identifications of this element type.

The identification of the passive element also comprises an individual identification I which identifies its individual state, particular its overhaul state (e.g., for a winding core, the number of winding cycles since its last overhaul). The individual identification can also identify a winding core as the "number twelve" winding core, for example, so that it is associated with a specific processing area and/or a specific maintenance sector. The individual identification I can be varied by processing devices VV, typically by a winding station which increases the number of winding cycles performed by the winding core, and by maintenance devices UV (e.g., a maintenance fitter who has replaced the winding band and returns to zero the number of cycles performed).

The identification of the passive element also contains a process identification P which relates to an educt/product element instantaneously associated with the element. For a winding core, this may be the nature of the wound products and their number. This identification part can be modified by processing devices VV (e.g., a winding station). This identification can, in particular, be read by processing devices and used for their own control and/or checking purposes so that the process control can at least partly be decentralized.

FIG. 4 shows the multipart identification of a processing device VV. The system identification S and individual identification I have the same functions as for a passive element (FIG. 3), the individual identification I also being variable by the actual element itself, symbolized in the figure by an arrow emanating from and pointing back to the element, such as for increasing the recorded number of cycles performed. The process identification P of a processing element VV identifies the function of the element in a process taking place or about to take place. It can contain details of the function (e.g., winding or unwinding function of an ambivalently-usable winding station) and data of the educt/product elements to be processed or different control data which can be used as function of the read-in identification of the educt/product.

Figure 5:
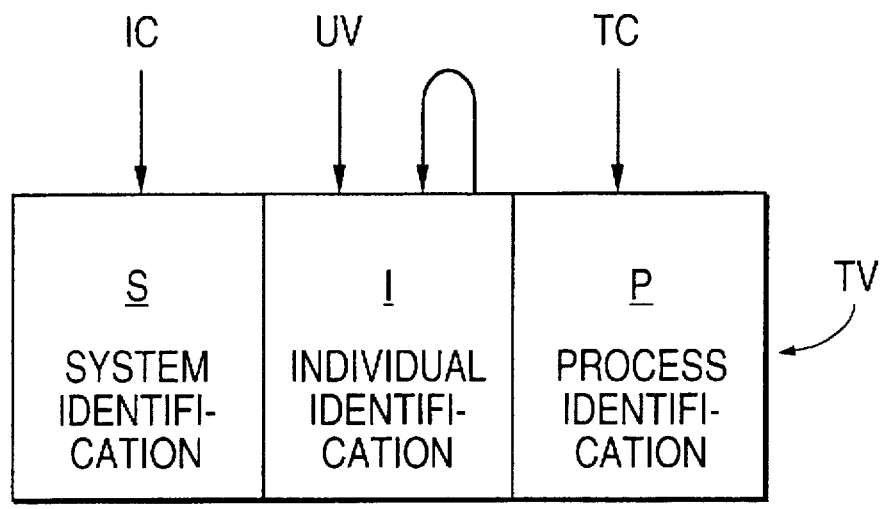
Figure 6:
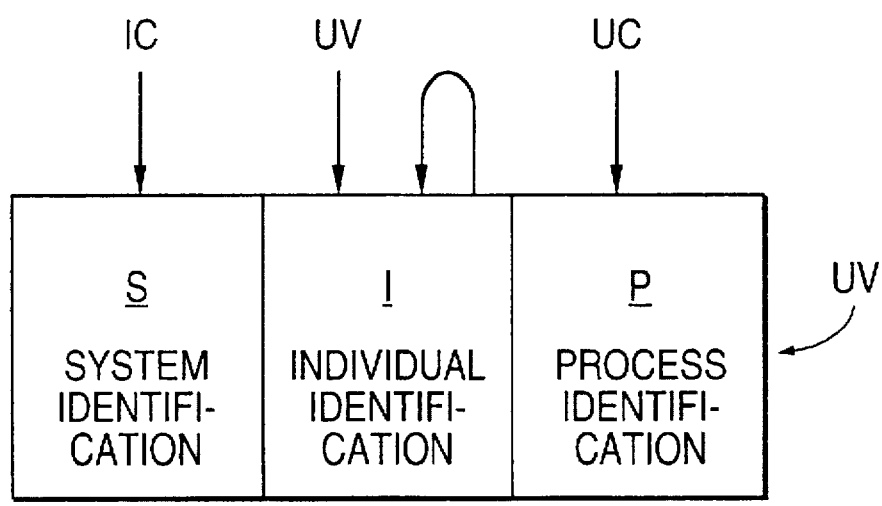

FIGS. 5 and 6 show the multipart identification of a transporting device TV and a maintenance device UV to which the description of the identifications of the passive elements (FIG. 3) and the processing elements (FIG. 4) are correspondingly applied.

As can be gathered from FIG. 2, in the described identification structure, no identification-modifying authorization is associated with the mobile conveying devices TV. However, this is possible if in the multipart identification of at least the mobile system elements a further identification part, specifically a position or place identification, is provided. That identification part would then be modified by a transporting device in such a way that is overwritten with the destination of the transporting device and would at all times identify the instantaneous location of the element. Such an identification part could then be used for "seeking" elements.

For the implementation of the described identification structure, electronic memories can be used as identification carriers. For example, an integrated circuit chip sold under the name MIDAT by Mikron GmbH, Graz (Austrian patent application 1737/90 filed Aug. 23, 1990) is commercially available, which integrated circuit, in addition to having the storage capacity necessary for the described use also has security functions protecting at against unauthorized writing and reading. For mobile, passive system elements (e.g., winding cores, pallets, containers) such a chip is advantageously used in conjunction with a reading/writing device which is associated with an active system element and from which the chip, through a coil, receives the necessary data and also the power required for performing the security functions, for emitting its own identification data and for the optionally necessary memory overwriting. This allows contactless data transmission and identification modification. Such an identification carrier is also suitable for mobile, active elements with which are associated no identification-modifying authorizations (e.g., mobile transporting devices), the range of the contactless transmission being extendible by a suitable booster. Active system elements with which are associated identification modification means in the form of writing/reading devices, can carry their identifications as a software part or as a separate chip.

A process and identification-oriented interaction between an active and a passive element, can take place in the following way. The system identifications of the two elements are compared with one another for identifying the elements with suitable competence structures (available to the writing/reading device). If the elements correspond to an interaction foreseen in the system, the process identifications of the two elements are compared. If they correspond to one another, the process-oriented interaction is permitted. Following the interaction, the process identification of the passive element is overwritten appropriately to the process-oriented interaction and, optionally, the individual identifications of both elements.

For the above-mentioned additional functions (control, checking, security and process evaluation) of the identification structure, reading devices can be provided at freely selectable points of the system. An example for such a security function is provided by a reading device which is arranged in a vertically movable manner on a travelling crane movable over a printed product roll stack store and which, for reading out the winding core or roll identifications, can be moved into the cavities of the cores of the superimposed rolls, reading out the roll identifications if, e.g., the corresponding data have been lost in a master computer. An example of an evaluation function is providing a reading device at a system output with which it is possible to read out identifications of educt/product elements to be delivered from the system for invoicing purposes. Reading devices at freely selectable system points can read out identification data, particularly educt/product element-concerning identifications or identification parts for use in a statistical function.

Figure 7:
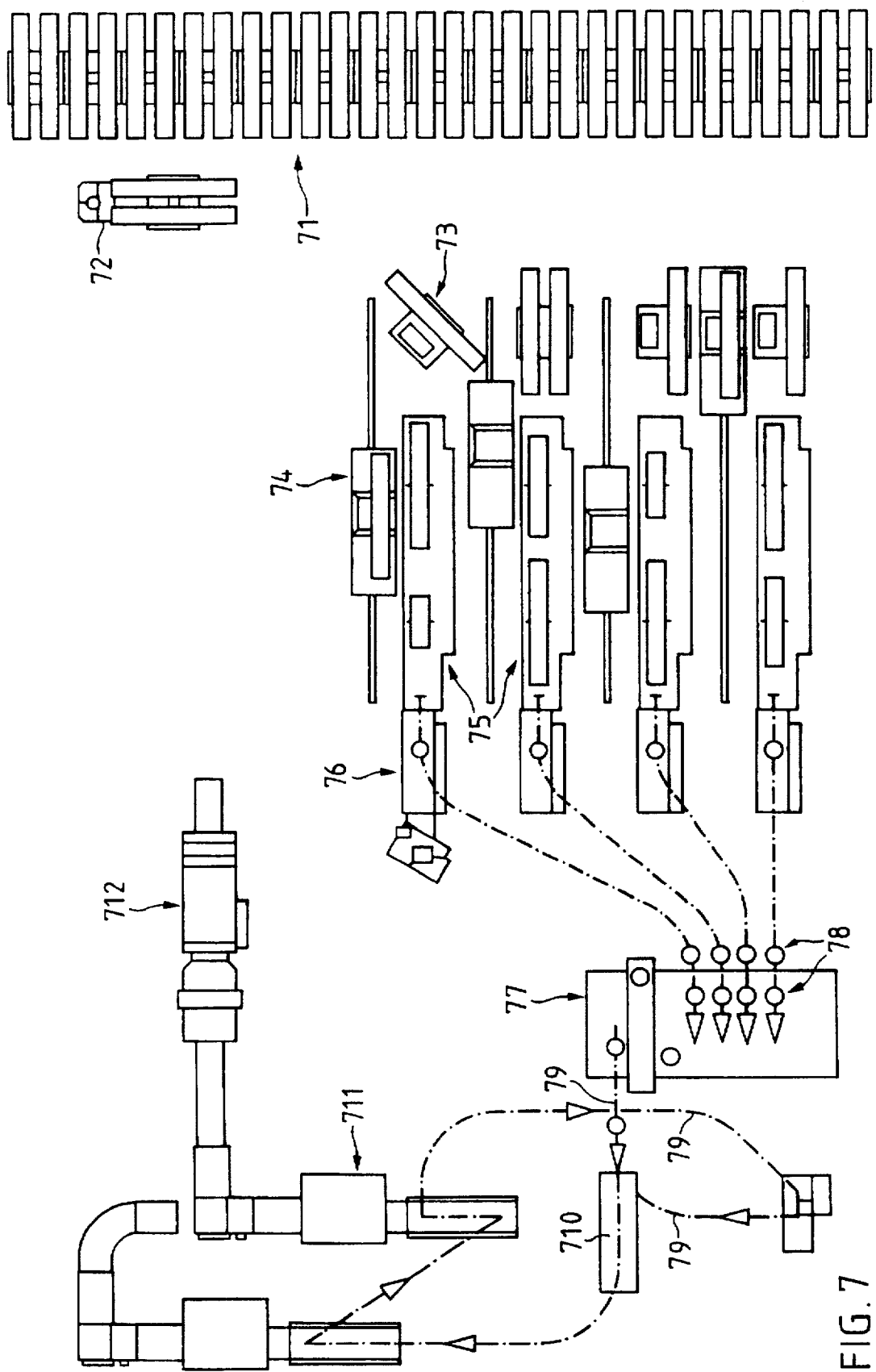
FIGS. 7 and 8 are schematic plan views of two examples of processing systems suitable for having an integrated identification structure in accordance with the invention.
Figure 8:
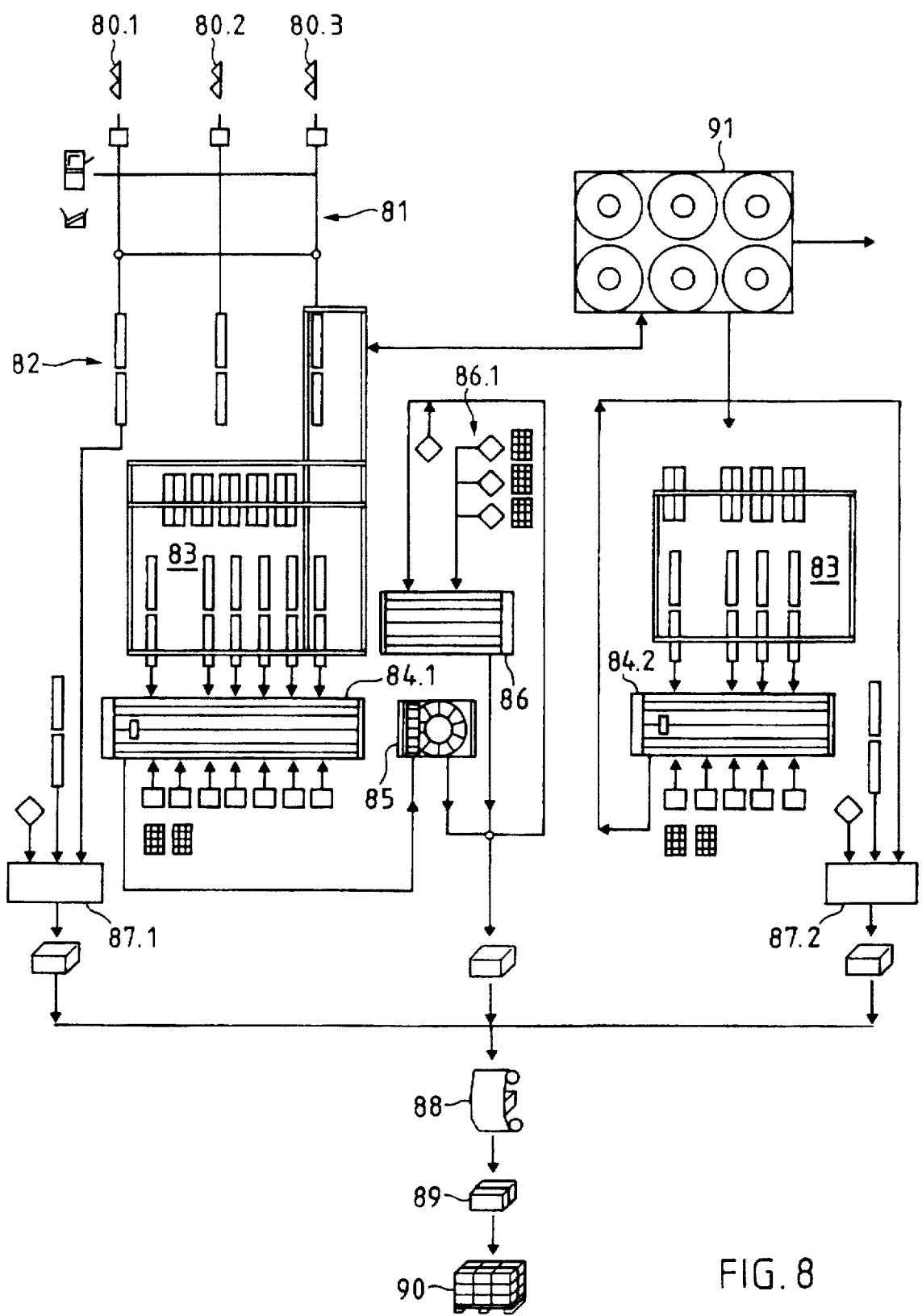

FIGS. 7 and 8 show two arrangements in which printing press products are further processed and which can be designed as inventive processing systems with associated identification structures.

FIG. 7 shows a simple system in which the printed products (educts) are supplied in roll or stack form and in which those products are collated and packed. The system elements (the function designation according to FIG. 1 is added in parentheses) are as follows: intermediate stores 71 of rolls (E/P-SE), roll transportation vehicle 72 (TV), automatic roll handling devices 73 cooperating with robot vehicles 74 (together VV), unwinding stations 75 (VV), rapid feeds 76 (VV), gathering stitching drums 77 with monitoring and control functions 78 (together VV), conveyor systems 79 (VV), discharge deflectors 710 (VV), trimmer 711 (VV) and film packing device 712 (VV). Such systems are known per se and consequently need not be described in detail here.

A simple identification structure associated with the system according to FIG. 7 can now, for example, perform the following functions. When entering the system, an identification carrier is applied to the winding cores if they have no such carrier. The roll identification is matched to the system by the identification controller and an entrance check controlled by the processing controller checks or resets the process identification of the rolls entering the system. At the unwinding stations, the roll process identification is checked and set to zero after unwinding. For this purpose, the unwinding stations have reading/writing devices. The toll process identifications can also be checked by the transporting vehicle 72 or the handling device 73.

FIG. 7 shows an example of a somewhat more complex identification with a finer subdivision of the reading and writing rights than has been described up to now for a winding core in a system.

Such a winding core is manufactured by a manufacturer, is supplied to a processing company and is there loaded with printed products and is, optionally, passed on to further processing companies with the aim of being returned to its parent company.

The manufacturer sets in a part of the individual identification (not modifiable by the customer) the type, manufacturing date, version number, band version, band length and maximum number of winding processes between inspections. The manufacturer or customer also sets in areas of the system identification the name of the owner or processing company, as well as a maximum number for winding cycles in foreign processing companies.

If products or parts of products are wound onto the core in the processing company, in the process identification, the product name, format, number of pages, number of wound products, product position, product spacing, product thickness and product weight are set in memory by the winding station. If the wound products are to be further processed in another processing company, when leaving his own company, the system controller sets the further user in the system identification and sets the winding cycle counter to zero.

When the roll enters the foreign processing company, at the entrance control the product type, product number and dispatching party (owner of the winding core) are read and made available to the process controller. By order of the latter, the transport controller gives the instruction to convey the roll into a buffer store and to hang it there on a preparation stand. The necessary manipulations are controlled by means of the identification data concerning the core type (width), product format and product type.

For processing the products of the roll, the roll is removed from the store and passed to an unwinding station by a request of the processing controller to the transport controller. The winding station checks the identification concerning the product and settings are made using the identifications concerning product format, thickness, position, etc. During unwinding, the data concerning the product number and winding cycle counter are actualized. If the winding core is empty, it is returned to the store and again the identification data are used for control purposes. If the winding cycle counter reading in a processing company which is not the home one is equal to the corresponding, permitted maximum number (e.g., 1), then the identification for the outside processing company is blocked (no longer writable). Such a winding core, as the result of reading its identification of its owner, is collected at a selected location with other such cores for joint return transport.

When the core returns to its home processing company, the identification concerning the number of winding cycles since the last inspection is compared with the maximum number set by the manufacturer and, in accordance with the comparison result, the core is returned to the processing operation or to maintenance.

The following table shows the identification of the described winding core, once again divided into the three areas: system identification S, individual identification I and process identification P (IC=identification controller, VC=processing controller).

| DATA | IDENTIF-ICATION PART | WRITING AUTHORITY |
|---|---|---|
| Owner | S | IC owner or manufacturer |
| Further users | S | IC owner |
| Max. winding processes (outside) | S | IC owner |
| Winding cycle counter (outside) | S | IC owner and winding station |
| Type | I | Manufacturer |
| Manufacturing date | I | Manufacturer |
| Version number | I | Manufacturer |
| Band version | I | Manufacturer |
| Band length | I | Manufacturer |
| Max. winding. processes (inspection) | I | Manufacturer |
| Winding cycle counter (inspection) | I | Winding station and maintenance fitter |
| Product name | P | Winding station or VC |
| Format | P | Winding station or VC |
| Number of pages | P | Winding station or VC |
| Number of products wound | P | Winding station |
| Product position | P | Winding station or VC |
| Product spacing | P | Winding station or VC |
| Product thickness | P | Winding station or VC |
| Product weight | P | Winding station or VC |

FIG. 8 shows a more complex system for the further processing of printing press products. The system has three printing presses 80.1 to 80.3 (VV), conveying system 81, (VV) for the continuous conveying of products from the presses to three winding stations 82 (VV), ten unwinding stations 83 (VV), two gathering stitching drums 84.1 and 84.2 (VV), a trimming drum 85 (VV), an insertion drum 86 (VV), a pre-collecting system 86.1 (VV), two rotary cutters 87.1 and 87.2 (VV), roll stores 91 (E/P-SE) with a store-serving fork lift (TV, not shown), a film wrapping device 88 (VV), a strapping device 89 (VV), and a palletizing location 90, e.g., for the manual palletizing of packets (VV).

A simple identification structure to be associated with the system according to FIG. 8 comprises identification carriers on the winding cores (SE) and on pallets (SE) to be loaded with packets produced and corresponding identification-modifying means on the winding and unwinding stations (VV) and at the palletizing location 90. The identifications of the winding cores, particularly the process identifications, are checked by transporting means between the winding stations 82, unwinding stations 83 and stores 91. Additional reading devices can be provided in store 91. The process identifications of the rolls or winding cores are modified at the winding stations 82 or 83.

I claim:

1. A processing system for processing products in a plurality of processing steps in which the products are modified, rearranged combined or relocated, the processing system comprising a plurality of different process paths for products passing through the processing system;

a plurality of active system elements each having a predetermined system function and authorization to act on predetermined other system elements in a predetermined way;

a plurality of passive system elements each capable of being acted on by one or more predetermined active system elements in said predetermined way;

sets of identification data carried by selected ones of said active and passive system elements, each set of identification data associated with a system element having a plurality of identification parts corresponding to said predetermined way said system element can be acted on;

means for modifying identification data, said means for modifying being associated with one specific active system element and having authorization to modify identification parts of system elements corresponding to a predetermined function of said element; and a plurality of means for reading and verifying identification data and for controlling system elements in accordance with information carried in said identification data.

2. A system according to claim 1 which includes non-system-inherent elements, said non-system inherent elements having no identification parts.

3. A system according to claim 1 wherein said plurality of identification parts includes a part identifying the associated element as belonging to a specific system, a part individually identifying the element and a part identifying the process stage of the element.

4. A system according to claim 1 wherein said passive system-inherent elements include winding cores, winding cassettes, pallets and containers, and wherein said active system-inherent elements include winding stations.

5. A system according to claim 1 wherein said elements carrying said sets of identification data include electronic memories for storing said data, said system including means for reading and writing said data.

6. A system according to claim 5 wherein said electronic memories comprise integrated circuits having said memories and further including means for preventing unauthorized reading or writing of said data.

7. A system according to claim 5 wherein said means for reading and writing comprises contactless coil communication means for transmitting and receiving energy and data.

8. A system according to claim 5 and including security, monitoring and process evaluating means, and means for reading data from said sets of data carried by said elements and transmitting said data to said security, monitoring and process evaluating means.

9. A system according to claim 1 wherein said sets of identification data carried by selected ones of said active system elements include authorization to modify portions of said data carried by said elements.

10. A system according to claim 1 including a system controller having authorization to modify system identification parts of all identification data.

11. A system according to claim 10 wherein said active elements include active servicing elements having authorization to modify at least part of individual identification parts of said sets of identification data.

* * * * *